US011830213B2

(12) United States Patent
Adkinson et al.

(10) Patent No.: US 11,830,213 B2
(45) Date of Patent: *Nov. 28, 2023

(54) REMOTE MEASUREMENTS FROM A LIVE VIDEO STREAM

(71) Applicant: STREEM, LLC, Portland, OR (US)

(72) Inventors: Sean M. Adkinson, North Plains, OR (US); Ryan R. Fink, Vancouver, WA (US); Brian Gram, Battle Ground, WA (US); Nicholas Degroot, Portland, OR (US); Alexander Fallenstedt, Portland, OR (US)

(73) Assignee: STREEM, LLC, Portland, OR (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/090,281

(22) Filed: Nov. 5, 2020

(65) Prior Publication Data

US 2022/0138979 A1    May 5, 2022

(51) Int. Cl.
*G06T 19/00*    (2011.01)
*G06T 7/62*    (2017.01)
(Continued)

(52) U.S. Cl.
CPC ............... *G06T 7/62* (2017.01); *G06T 7/50* (2017.01); *G06T 7/73* (2017.01); *G06T 19/006* (2013.01);
(Continued)

(58) Field of Classification Search
None
See application file for complete search history.

(56) References Cited

U.S. PATENT DOCUMENTS

| 11,024,079 | B1 * | 6/2021 | Chuah | G06T 7/246 |
| 2013/0100114 | A1 * | 4/2013 | Lynch | G06T 11/00 |
| | | | | 345/419 |

(Continued)

FOREIGN PATENT DOCUMENTS

| CN | 109685913 A | * | 4/2019 |
| JP | 2012-194002 A | | 10/2012 |

OTHER PUBLICATIONS

"ProArMeasure", Plus, Huawei P30 Pro AR Measure | Measure length, depth, area and volume, https://www.youtube.com/watch?v=-0OX5QaK7YY AR Measure—measure area and volume, Mar. 26, 2019 (Year: 2019).*

(Continued)

*Primary Examiner* — Steven Z Elbinger
(74) *Attorney, Agent, or Firm* — Schwabe Williamson & Wyatt (57) ABSTRACT

Embodiments include systems and methods for remotely measuring distances in an environment captured by a device. A device captures a video stream of a device along with AR data that may include camera pose information and/or depth information, and transmits the video stream and AR data to a remote device. The remote device receives a selection of a first point and a second point within the video stream and, using the AR data, calculates a distance between the first and second points. The first and second points may be at different locations not simultaneously in view of the device. Other embodiments may capture additional points to compute areas and/or volumes.

20 Claims, 8 Drawing Sheets

(51) Int. Cl.
*G06T 7/50* (2017.01)
*G06T 7/73* (2017.01)
*G06F 3/04842* (2022.01)

(52) U.S. Cl.
CPC ...... *G06F 3/04842* (2013.01); *G06T 2200/24* (2013.01); *G06T 2207/10016* (2013.01); *G06T 2207/10028* (2013.01); *G06T 2219/024* (2013.01)

(56) References Cited

U.S. PATENT DOCUMENTS

| | | | |
|---|---|---|---|
| 2015/0187091 A1 | 7/2015 | Hata et al. | |
| 2017/0115488 A1* | 4/2017 | Ambrus | G02B 27/0172 |
| 2018/0114349 A1 | 4/2018 | Liu | |
| 2018/0130210 A1* | 5/2018 | Hall | H04N 5/23267 |
| 2018/0350073 A1* | 12/2018 | Shokri | A61B 5/1072 |
| 2019/0370590 A1 | 12/2019 | Sun et al. | |
| 2020/0013187 A1* | 1/2020 | Hong | G06T 19/00 |

OTHER PUBLICATIONS

"ArMeasure", Karasec, AR measure—Automatic measurement in Augmented Reality, https://www.youtube.com/watch?v=7OCQfH76vg4, Mar. 16, 2019 (Year: 2019).*

"PLNAR", PLNAR, Vertical and 3D AR measurements are here! Augmented Reality measurement tool, https://www.youtube.com/watch?v=DfMQn36oHhl, Apr. 1, 2018 (Year: 2018).*

Wu et al., machine translation of CN-111127561-A, May 8, 2020 (Year: 2020).*

Korean Intellectual Property Office; International App. No. PCT/US2021/055298; Filing Date: Oct. 15, 2021; International Search Report and Written Opinion; dated Feb. 3, 2022; pp. 1-11.

* cited by examiner

REMOTE MEASUREMENTS FROM A LIVE VIDEO STREAM

TECHNICAL FIELD

The present disclosure relates to the field of augmented reality (AR), and specifically to processing of a video stream and AR data by a remote device to enable measurements of objects in the video stream by the remote device.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors and/or motion information captured from motion sensors such as a MEMS gyroscope and accelerometers, can facilitate AR software in creating a point cloud in a three-dimensional space. This point cloud enables AR-based applications to generate and place virtual objects within a 3-D space represented by the captured images and/or video. These point clouds may be associated and stored with their source images, video, and/or depth or motion data.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A device that supports augmented reality ("AR") typically provides an AR session on a device-local basis (e.g., not requiring communication with a remote system), such as allowing a user of the device to capture a video using a camera built into the device, and superimpose AR objects upon the video as it is captured. Support for superimposing AR objects is typically provided by the device's operating system, with the operating system providing an AR application programming interface (API). Examples of such APIs include Apple's ARKit, provided by iOS, and Google's ARCore, provided by Android.

The APIs typically use both the stream of frames captured by the device camera as well as other available motion data, such as a gyroscope and/or accelerometers contained within the device, to compute a point cloud. The available motion data allows the camera pose, the position of the camera in space relative to its surrounding environment, to be determined as the device moves. Knowing the camera pose helps establish an accurate point cloud when using a handheld or similar mobile device that may move while simultaneously capturing the surrounding environment.

The point cloud typically includes one or more points that are indicated by an x, y position within the device's environment, such as coordinates on a screen attached to the device while the one or more points are visible to the camera. A depth (or z-axis) point may also be measured directly (if the device is so equipped) or computed for each of the one or more points. The x, y, and z positions of each point in the point cloud may be tied to or expressed with respect an identified anchor feature within the frame, e.g. a corner or edge of an object in-frame, which can be readily identified and tracked for movement between frames, or to some other fixed reference point. The associated x, y, and z values in combination with camera pose data further allow each point in the point cloud to be identified in space relative to the device. As may be appreciated, x, y, and z values calculated with respect to a moving device will continuously change for each detected/calculated point as the camera of the capturing device moves in space relative to the anchor features. In some implementations, each point in the point cloud may include additional data, such as a confidence value indicating the API's estimate of the accuracy of the computed depth value, location of the anchor point, and/or possibly other extrapolated values.

The calculated point cloud allows AR objects to be placed within a scene and appear to be part of the scene, viz. the AR object moves through the camera's view similar to other physical objects within the scene as the camera moves. Further, by employing object detection techniques along with motion data, in some implementations the API can maintain track of points that move out of the camera's field of view. This allows a placed AR object to disappear off-screen as the camera moves past its placed location, and reappear when the camera moves back to the scene location where the AR object was originally placed.

As may be understood from the foregoing description, the point cloud represents location data about the physical world relative to and surrounding the capturing device. The various points in the point cloud may thus (in most implementations) be expressed as values relative from the capturing device. When the capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world passes through the field of view of the capturing device. When combined with continued tracking/storage of detected points that move outside the camera's field of view, the point cloud representing the world detected and viewed through the capturing device's camera that is initially generated can be progressively increased and expanded.

The captured point cloud can be used to identify the location of one or more of the points in the point cloud relative to each other. For fixed or stationary objects that are mapped within the point cloud, the spatial relationship of two points within the point cloud tied to stationary objects are expected to remain consistent, even while the position of the device and its camera may be in a relative state of flux as the camera changes orientation and position with device movements. These stable positions may be subject only to refinement in position as the device is able to capture additional data around a given point when the point is within view of the device. Furthermore, the spatial relationship of points within the point cloud can persist between points that are not normally simultaneously in frame, viz. the device camera must be panned or moved away from one point to view another. The use of camera movement data/camera pose can help establish the spatial relationship between two points within the point that are captured at different locations by the device camera.

With the spatial position of various points within the point cloud determined, measurements can be made between arbitrary fixed points within the point cloud. Thus, in disclosed embodiments, measurements can be taken both of objects fully within the frame of the device camera, as well as objects where the device must be panned or moved to fully capture, e.g. a long or tall object in a room where the device camera cannot be positioned to capture the entirety of the object. Still further, disclosed embodiments are not limited to linear measurements. By including reference to three, four, or more points, arbitrary areas can be computed from at least three point cloud points that define a plane, as well as volumes for arbitrary 3D regions that can be defined by reference to at least four point cloud points.

Most devices capable of capturing point cloud data are further capable of network communications with a remote device or server. The device may transmit the point cloud data over the network to the remote device or server, allowing the remote device or server to compute distances, areas, and/or volumes from the point cloud data by internal reference between points within the point cloud. Still further, by also transmitting camera pose data as a continually changing data stream, a user of a remote device or server could instruct a user of the device to position the device camera at desired locations to capture additional point cloud data that may have not been previously captured. This additional data may then be used to take measurements of an object that was only partially viewable. The ability to provide guidance over a remote communications session, and to direct a user of the device to capture data for measurements of portions of objects, can enable a user of the remote device or server to provide service or assistance to a user of the device. Other possible embodiments will be described herein as appropriate.

Figure 1:
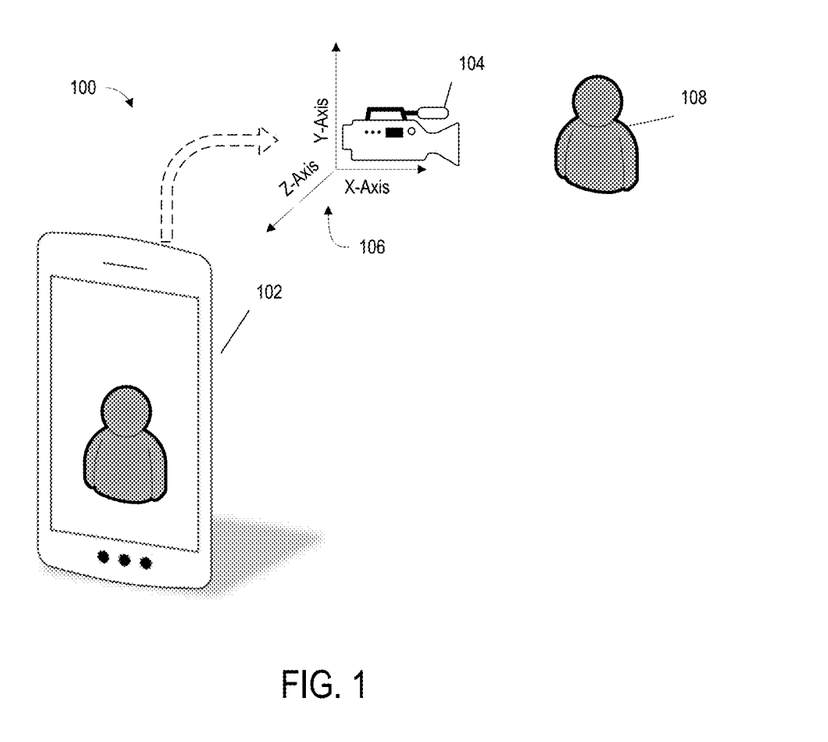
FIG. 1 illustrates a block diagram of the components of a system for capturing a video stream and corresponding AR data, according to various embodiments.

FIG. 1 illustrates an example system 100 that may enable capture of an image or video that includes AR data. System 100 may include a mobile device 102. In the depicted embodiment of FIG. 1, mobile device 102 is a smartphone, which may be implemented as a computer device 500, to be discussed in greater detail below. Other embodiments may implement mobile device 102 as a variety of different possible devices, such as a computer (desktop or laptop), tablet, two-in-one, hybrid, smart glasses, or any other computing device that can accept a camera and provide necessary positional information, as will be discussed in greater detail herein. Mobile device 102 further may include a camera 104 and one or more spatial position sensors 106 (depicted by a series of axes), which provides information about the spatial position of camera 104, also known as the camera pose. It will be understood that camera 104 and spatial position sensors 106 may be contained within the body of mobile device 102. Camera 104 is used to capture the surrounding environment of mobile device 102, and by extension, the user. The environment may include one or more three-dimensional objects 108.

It should be appreciated that while mobile device 102 is depicted as a smartphone, mobile device 102 could be any device that includes a camera 104 and associated spatial position sensors 106 that can be moved about an environment. For example, in some embodiments mobile device 102 could be a laptop or tablet. In other embodiments, mobile device 102 could be a sensor package that includes camera 104 and spatial position sensors 106 which is in communication with a separate processing unit, such as a desktop computer or server. The sensor package may communicate with the separate processing unit via a wireless or wired link.

Camera 104 may be any camera that can provide a suitable video stream for the intended purpose of device 102. Where mobile device 102 is implemented as a smartphone or tablet, camera 104 may be one or more built-in cameras. In other embodiments, such as where mobile device 102 is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and mobile device 102. In other embodiments, such as where mobile device 102 is equipped with multiple cameras and/or similar sensors, one or more of the sensors may be configured to directly detect depth points, such as a 3D camera, stereoscopic camera, LI DAR, or other suitable depth-sensing technology.

Spatial position sensor 106 may be configured to provide positional information about the pose of camera 104, such as camera 104's pan and tilt. Other measured positional vectors may include camera movements, such as the camera rising or falling, or moving laterally, which allows the camera pose to be tracked and updated as mobile device 102 is moved through space in the environment relative to any static objects. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
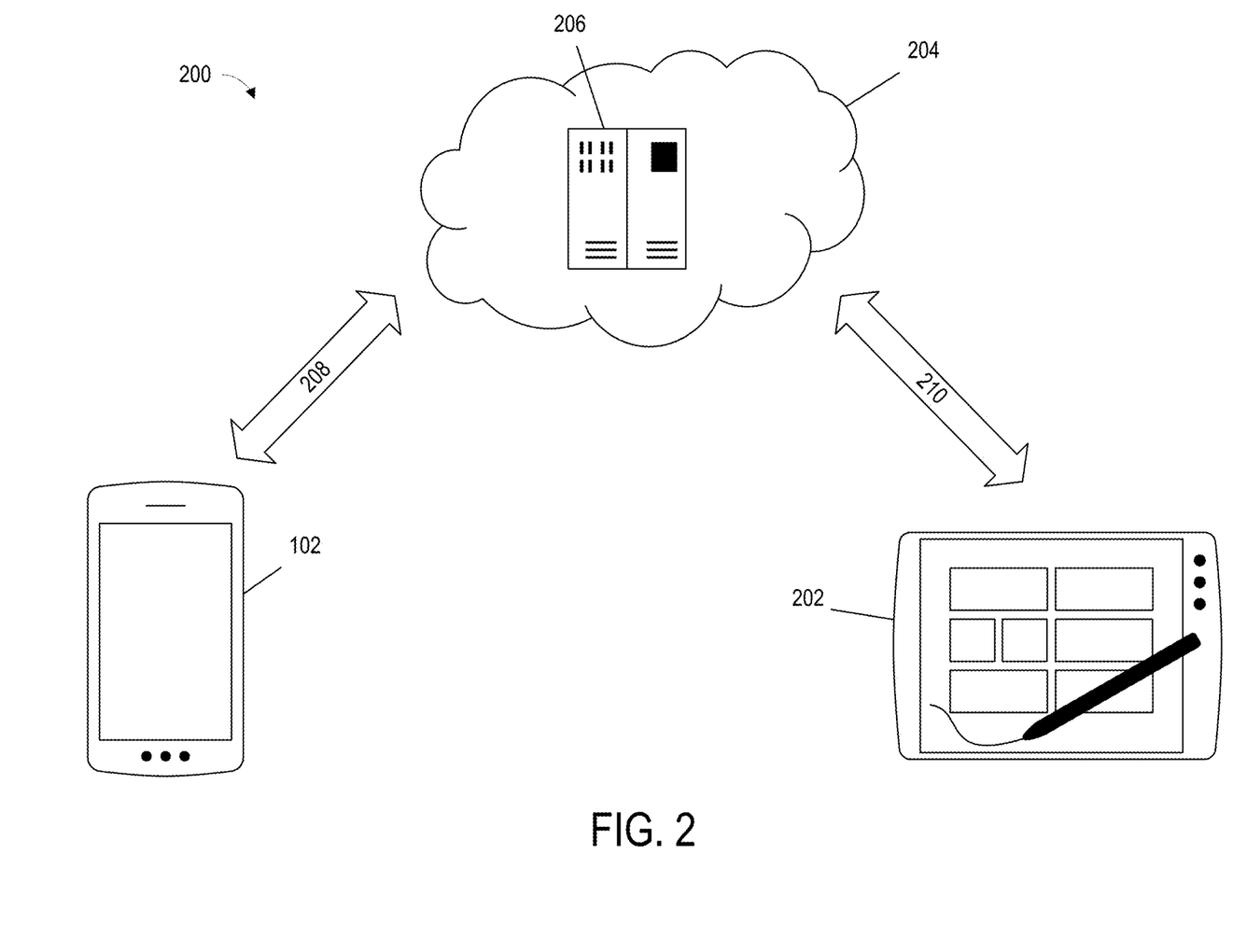
FIG. 2 illustrates a block diagram of the system components of one possible embodiment of an augmented reality system operable over a network, according to various embodiments.

FIG. 2 illustrates an example system 200 that embodies an augmented reality (AR) platform for interacting with a remotely provided video stream using AR objects. System 200 may include a mobile device 102 and a remote device 202, which in turn may be linked via a network 204. In embodiments, system 200 may receive a data stream from mobile device 102 that includes a video stream along with associated AR data, as described above with respect to FIG. 1. The data stream from mobile device 102 may then be transmitted to a remote device 202, where a user of the remote device 202 can interact with the data stream, including inserting AR objects or performing AR-based tasks, such as distance and area measurements, on the data stream that are reflected back to the mobile device 102.

Figure 5:
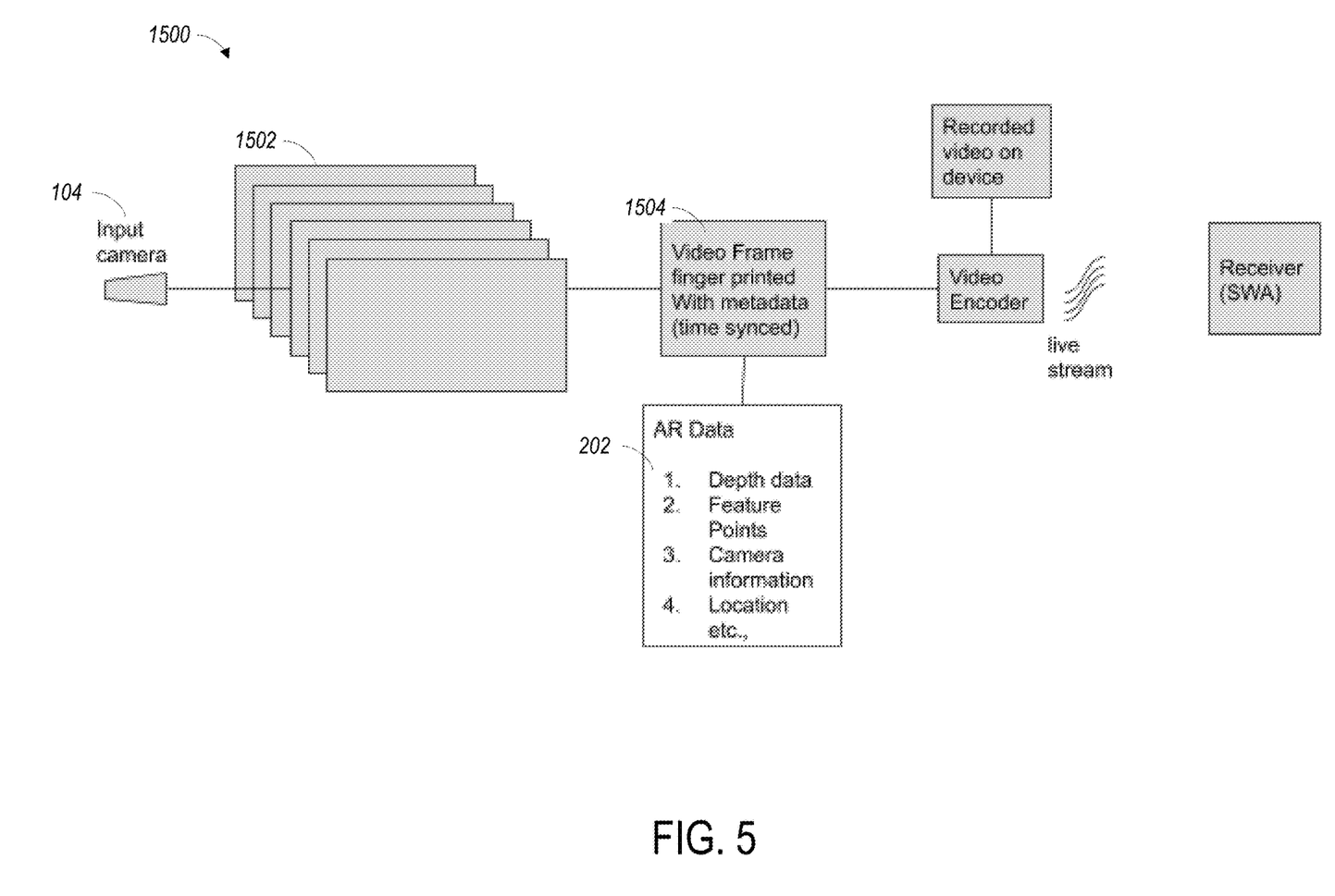
FIG. 5 depicts an example high-level flow for fingerprinting a captured video for synchronization with contemporaneously captured AR data, according to various embodiments.

Mobile device 102, described above with respect to FIG. 1, and remote device 202 may be a computer system such as the computer device 500 depicted in FIG. 5, and in some embodiments may be a mobile device such as a smartphone, tablet, or other similar device that has an integrated processor, screen, video camera, and network communications interface. In other embodiments, mobile device 102 may be a computer system with discrete components, e.g. the system box or CPU is distinct from I/O peripherals. Mobile device 102 and remote device 202 may be, but do not need to be, identical. For example, a service provider may prefer to use a dedicated computer terminal (e.g. a desktop or laptop computer) to interact with a mobile device 102. Likewise, a consumer may prefer to use a tablet or laptop as alternatives to a smartphone for mobile device 102.

Mobile device 102, in embodiments, is capable of transmitting video captured by camera 104 to remote device 202 over a network 204, as well as receiving data over network 204 that is supplied by a user of remote device 202. Remote device 204, similarly, is capable of receiving data such as video over network 204 from mobile device 102, and allowing a user of remote device 202 to place one or more AR objects into or otherwise interact with the received video. Remote device 202 can then transmit information about the placed AR object(s) over network 204 back to mobile device 102, whereupon mobile device 102 updates a display attached to mobile device 102 to depict the captured photos and/or video with the placed AR object(s).

Mobile device 102 may run a dedicated app to provide functionality for system 200. Other embodiments may allow functionality to be handled via a web site or web application (e.g. a software as a service, "SaaS", approach). Still other embodiments may use dedicated hardware, or a combination of software and hardware, to provide functionality for system 200 to the user. Likewise, remote device 202 may run a dedicated app to provide functionality for system 200, or use a web site, web application, dedicated hardware, or a combination of the foregoing. Some embodiments may use the same app or other method of delivering necessary functionality on both mobile device 102 and remote device 202, with functionality appropriate to the user enabled based upon a user-supplied credential or other indication of the user's role. For example, such an app may provide for capture and transmission of video when configured in a consumer role, and enable placement of one or more AR objects when configured for a service provider or assistant role. Other embodiments may provide separate apps (or other methods) for a user of mobile device 102 and remote device 202. In some embodiments, a central server 206, discussed below, may provide some or essentially all functionality for system 200, with any application or website on mobile device 102 and/or remote device 202 acting essentially as a front end for displaying and interacting with content provided by central server 206.

In embodiments and as mentioned above, system 200 provides the ability for a user of either mobile device 102 or remote device 202 to superimpose one or more AR objects to assist in the remote delivery of services or to facilitate a video communications session between mobile device 102 and remote device 202. Central server 206 may coordinate and synchronize, or assist in the coordination and synchronization, of such AR objects between mobile device 102 and remote device 202. The functionality of synchronizing AR objects may be supplied by central server 206, mobile device 102, remote device 202, a combination of two or more of the foregoing, and/or via another provider or source external to system 200, depending upon the specifics of a given implementation. Although previous embodiments described placement of AR objects by the user of remote device 202, in other embodiments mobile device 102 may also allow placement and interaction with AR objects, which may further be transmitted and reflected on remote device 202.

Network 204 may be a network capable of supporting the exchange of a video feed between mobile device 102 and remote device 202 as well as augmented reality instructions. In some embodiments, network 204 may comprise the Internet, a local area network, wide area network, metropolitan area network, or a combination of the foregoing, or another suitable type or types of network communication. As can be seen, mobile device 102 may connect to network 204 via a communications link 208, and remote device 202 may connect to network 204 via a communications link 210. Each of communications links 208 and 210 may be any one or more of the foregoing network types. The various devices that comprise network 204 are well known to practitioners skilled in the relevant art, and will not be discussed further herein.

In some embodiments, network 204 comprises a server, collections or clusters of servers, one or more data centers, or other suitable means for data processing. For example, network 204 may be implemented as a cloud service, with mobile device 102 and remote device 202 each connecting to the cloud service. The cloud service may be operated by a provider of services for system 200. In the depicted example, network 204 includes a central server 206, which may be controlled by the provider of some or all of system 200. Central server 206 may comprise one or more computer devices 500, such as is known for data centers and cloud services. Further, depending on the specific needs of a given implementation, central server 206 may be implemented in a distributed fashion, with multiple nodes potentially located in geographically diverse areas.

Central server 206 may be configured to handle some or all of the functionality of system 200 described above. For example, central server 206 may handle processing of a video stream from mobile device 102, and/or processing insertions of AR objects from remote device 202. Central server 206 may further coordinate the synchronization of one or more AR objects placed by remote device 202 to mobile device 102, for presentation on a screen associated with mobile device 102. In some embodiments, central server 206 may handle any image analysis, including object recognition or AI processing, which may be used to help compute the point cloud and/or any associated anchor points or features. In other embodiments, central server 206 may receive the results of any image analysis, and supply the results to mobile device 102. In yet other embodiments, central server 206 may receive video from mobile device 102 as described above, and handle processing.

Some combination of any of the foregoing embodiments may also be possible, with a different approach taken depending upon the nature and capabilities of a given mobile device 102. For example, where mobile device 102 is a smartphone running a dedicated app, mobile device 102 may be able to perform some or all object recognition on a captured video. In contrast, where mobile device 102 is a web browser, mobile device 102 may simply pass any video to central server 206 for processing and recommendations.

Mobile device 102 and remote device 202, in the disclosed embodiments, are capable of establishing a two-way communications link, thereby allowing a user of mobile device 102 to directly connect to remote device 202 without need of leaving system 200. In some embodiments, system 200, such as via central server 206, coordinates communications, acting as a relay or communications provider. In such embodiments, central server 206 may also coordinate exchange of AR objects between mobile device 102 and remote device 202. In other embodiments, mobile device 102 and remote device 202 directly link over network 204 without going through a central server 206. In such an embodiment, any AR objects inserted into the video stream are communicated directly from one device to the other. In some such embodiments, either mobile device 102, remote device 202, or aspects of both, may provide the functionality and serve in the capacity of central server 206.

It should be understood by a person skilled in the relevant art that the labeling of mobile device 102 and remote device 202 are only for the sake of example to denote a likely relationship between the users of each device. There may be no practical difference (if any difference at all) between the functionality and capabilities of mobile device 102 and remote device 202.

Figure 3:
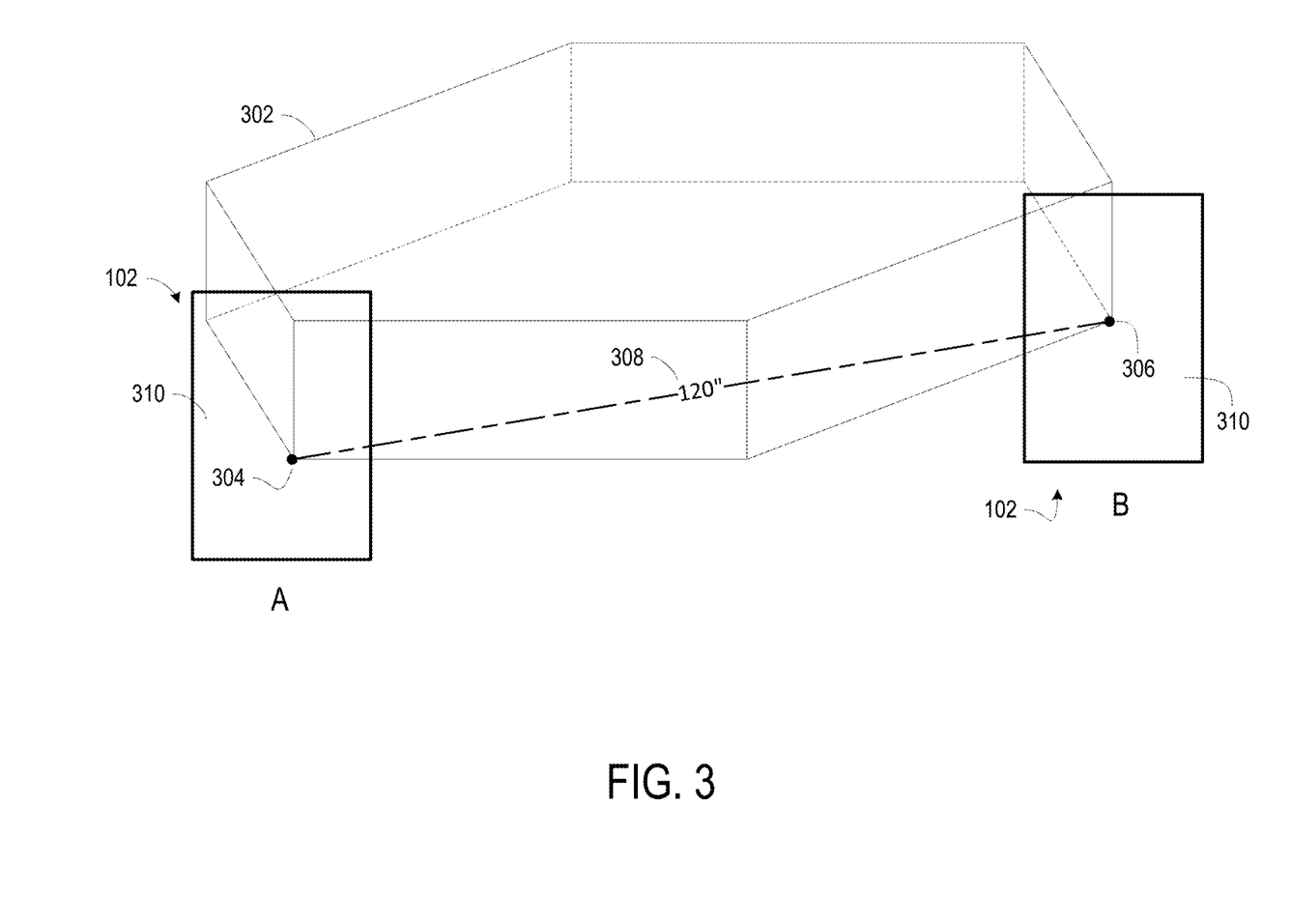
FIG. 3 is a diagram depicting the selection of points to be measured on an object and associated camera movements, according to various embodiments.

FIG. 3 depicts an arrangement in which mobile device 102 may be used to measure an object 302, according to various embodiments. As depicted in FIG. 3, object 302 is larger than the field of view 310 of mobile device 102, thus necessitating mobile device 102 be panned or moved with respect to object 302. Starting with mobile device 102 in position A, a first point 304 is selected on object 302. Next, mobile device 102 is moved from position A to position B, at which position a second point 306 is selected. Where the location of first point 304 and second point 306 can be determined in three dimensions (x, y, z) relative to each other, as part of a point cloud, the distance of a line 308 (e.g., 120") connecting first point 304 and second point 306 can be readily calculated using basic trigonometry. In some embodiments, the location of first point 304, second point 306, and/or line 308 may be graphically represented on a display of mobile device 102 as augmented reality objects.

As depicted in FIG. 2, mobile device 102 may be in communication with a remote device 202, which receives a video feed from mobile device 102, including the view of object 302 within field of view 310 of mobile device 102. By also transmitting the point cloud data and camera pose calculated and/or detected by mobile device 102 to remote device 202, a user of remote device 202 can select first point 304 and second point 306 remotely, and thereby calculate the length of line 308. Furthermore, the two-way communication between mobile device 102 and remote device 202 can enable the user of remote device 202 to provide instructions or guidance to the user of mobile device 102. The user of remote device 202 can thus instruct the user of mobile device 102 on where to hold mobile device 102 and the direction to move so that the user of remote device 202 can locate the first point 304 and second point 306.

While FIG. 3 depicts measurement of a line, it should be understood that selection of additional points can allow for measurement of planes, such as where a third point is selected, or solids/bodies, such as where a fourth point is selected.

Figure 4:
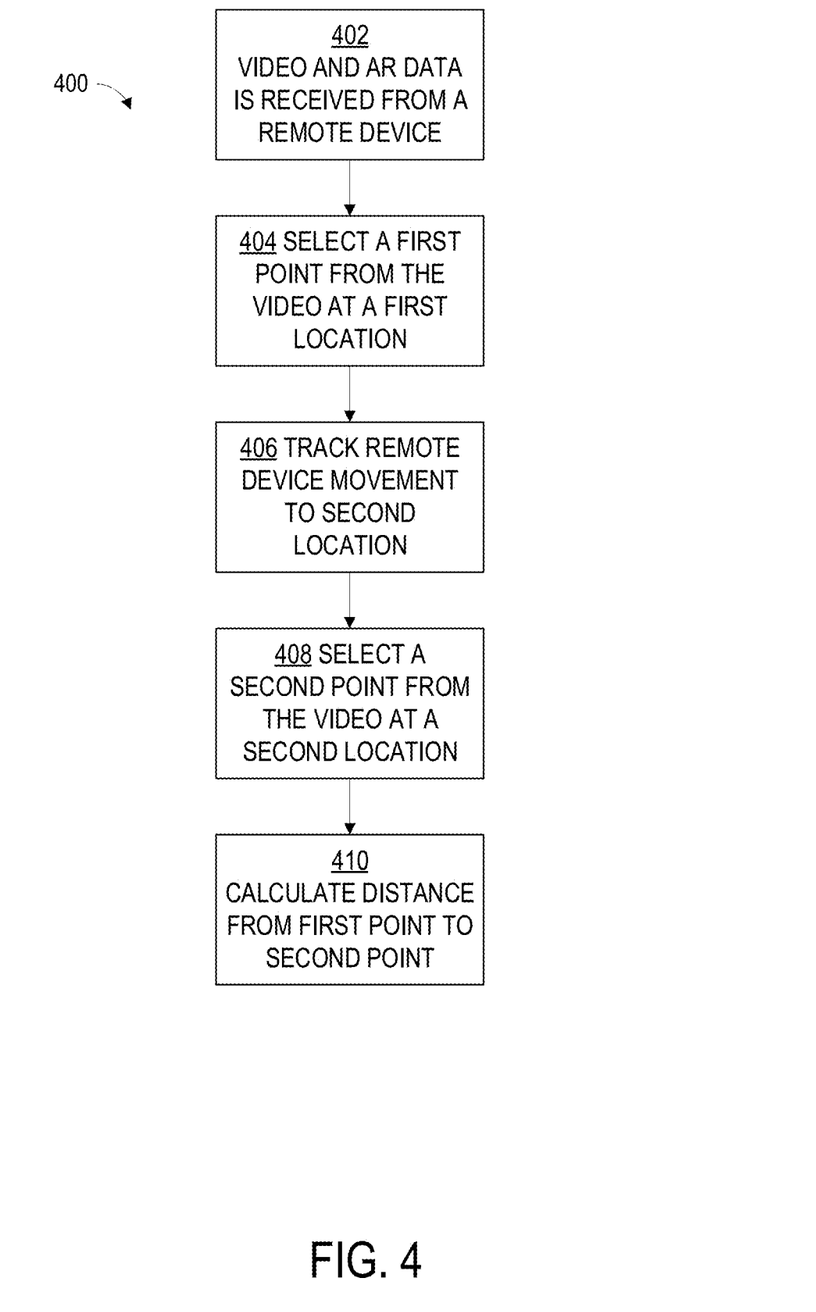
FIG. 4 is an example method for performing measurements, by a remote device, on a video stream captured by a mobile device, according to various embodiments.

FIG. 4 depicts an example method 400 for taking measurements remotely from a video stream. The operations of method 400 may be executed in whole or in part, and some operations may be removed or added depending upon the needs of a given implementation. Method 400 may be executed by system 200, described above.

In operation 402, a video stream and associated AR data, including both point cloud data and camera pose/motion data, is received from a mobile device, such as mobile device 102, by a remote device, such as remote device 202. The video stream may be captured by an input device, such as a camera 104 of a mobile device 102, along with associated motion data, such as may be obtained from sensors 106. This video is then, in embodiments, processed by the AR API of the capturing device (e.g. ARKit, ARCore) to generate AR data. As can be seen in example system 200, in some embodiments the video stream may be received at remote device 202 following relay or partial processing by a central server, such as central server 206. In other embodiments, the video stream may be received directly from the mobile device by the remote device. The point cloud data may further be directly captured by the mobile device, such as where the mobile device is equipped with sensors for directly measuring the depth of points within the scene being captured by the mobile device. Camera pose/motion data may be captured by one or more sensors equipped to the mobile device, such as gyroscopes, accelerometers, and/or other motion sensors, such as spatial position sensors 106 on mobile device 102.

In some embodiments, the mobile device is not equipped to directly capture the point cloud data. In such embodiments, the point cloud data may be at least partially computed from the video stream, using techniques such as photogrammetry to calculate depth data from adjacent video frames that provide slightly different views, similar to views that may be obtained from a stereoscopic camera. In some embodiments, this computation may be handled by the mobile device directly, such as with an AR API that is running on the mobile device. In such implementations, the point cloud data is transmitted from the mobile device to the remote device. Alternatively or additionally, some or all of the point cloud data may be computed by a server, such as central server 206. In such embodiments, the mobile device may only send the video stream along with camera pose/motion data to the server. The server can then compute the point cloud from the video stream and camera pose/motion data. Use of a server for calculation may be desirable in implementations the mobile device lacks sufficient power to compute a point cloud on the fly, and/or where the central server could run enhanced or more computationally intense algorithms that would yield a more precise point cloud than an AR API running on the mobile device could supply. Following computation of the point cloud, the central server can then transmit the information to the remote device. In some embodiments, the central server may also pass through to the remote device the video stream and camera pose/motion data received from the mobile device along with the point cloud data.

In still other embodiments, the remote device, such as remote device 202, may handle the processing and computation of point cloud data, similar to a central server. In such embodiments, the mobile device may transmit the video stream and camera pose/motion data to the remote device, with the camera pose/motion data tagged to the video stream frames, whereupon the remote device handles processing and computation of the point cloud data.

Note that, as used herein, AR data is not data about AR objects, rather, AR data is the data that corresponds to each frame in the video stream that may be necessary to enable the placement of AR objects within the captured scene.

The AR data may be captured contemporaneously with and/or extracted from, the video stream, and may be tagged to the video stream potentially on a frame-by-frame basis (discussed in greater detail below). The AR data may include camera motion/camera pose data (such as captured by spatial position sensors 106), AR feature point data, depth data directly measured by a depth sensor, predicted/computed depth data, as discussed above, and/or disparity maps. Other embodiments may include additional data types, different data types, or fewer data types. The various types of AR data may be derived from various raw data inputs, including RGB images (such as the sequence of frames of the video stream), camera intrinsics/pose and/or camera transforms (such as from camera 104 and/or spatial position sensor 106), 3D feature points, and/or depth images, among other types of possible data. RGB images may be extracted from frames of the video stream.

In addition to motion data, camera intrinsics can include various known or readily determined properties of the capturing camera, such as focal length, aperture, optical center, angle of view, focal point, etc. For example, knowing the focal point of a camera can allow a rough approximation of distance (depth) to a feature when that feature is in focus. Whether a feature is in focus may be determined by techniques such as edge detection or another contrast-based technique. However, it will be appreciated that, in some instances, only a range of depths may be determined, such as where the camera is focused relatively far away from the camera position, and/or the camera utilizes a small aperture (relatively high f-stop, such as f/8, f/11, etc.), so as to offer a large depth of field.

Camera transforms can include the various variables necessary to transform between the 3D objects within the field of view of the camera and the 2D image plane of the camera. Such variables can include information about the spatial location of the capturing device. 3D feature points can include feature points useable by the AR API or central server to create the AR feature point data, and may be extracted from the video stream, such as various anchor points or features, and/or captured using one or more sensors, such as spatial position sensor 106. Directly measured depth images can include imaging captured by a depth-sensitive device, such as a LIDAR sensor or infrared range finder, to allow for direct, and potentially more precise, depth measurements of various points within the scene captured by the camera. Where direct depth measurements are available, data similar to that available for the camera may be used (e.g., camera intrinsics and camera transforms) to process the depth measurements and correlate with the images from the camera.

As mentioned above, AR feature point data can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. Depth data may include the aforementioned direct depth measurements, which may be correlated with identified AR feature point data by the AR API. Corollary to or alternative to directly measured depth data includes predicted depth data, which the AR API may derive from any number of techniques, such as machine learning, or photogrammetry and comparison between proximate frames of the captured video. Similar to such comparison are disparity maps, which may include a map indicating the field of view differences between left/right frames in the case of a stereo camera, or proximate frames of the captured video. A disparity map may be useful for computing points in the point cloud, including obtaining predicted depth data. It should be understood that proximate frames need not be temporally adjacent in the video stream, but rather proximate in terms of field of view: two frames need only simply share at least an overlapping portion of a given scene to be considered proximate for purposes of a disparity map.

In operation 404, a first point, such as first point 304 (FIG. 3), is selected from the video stream at a first location, such as location A, with reference to FIG. 3. This first point may be directly selected by a user of the mobile device, such as by touching or otherwise indicating on the mobile device a particular point in the video stream displayed on the mobile device, such as view 310. The first point may alternatively be selected using a stylus, mouse, keyboard, or any other suitable method for selecting a point within the displayed view on the mobile device. Selecting this point, in embodiments, causes the mobile device to register a specific x, y coordinate on the mobile device display. This selected point is registered by the mobile device and correlated to a particular x, y location within the video stream. By referencing corresponding point cloud data, the depth information can be tagged to the selected point as the z coordinate (depth data) or location. The location of the selected point may then be transmitted to either the central server (if present/utilized) and/or the remote device. Depending on whether the mobile device or a central server handles processing and determining of depth cloud data, this tagging or correlation can be performed by either the mobile device or passed through and performed by the central server.

As mentioned above, the mobile device may be engaged in a two-way communications session with the remote device, such that a user of the remote device may be able to provide direction to a user of the mobile device, e.g. directing to point the camera at a particular object or feature, hold the camera in some fashion, etc. In some embodiments, the user of the remote device may be able to select the first point at the remote device. In such embodiments, selecting the first point on the remote device causes the x, y coordinate to be registered with respect to a display on the remote device, and then correlated to the point cloud data to determine the corresponding z coordinate/depth data.

Selection of the first point, as mentioned above with respect to FIG. 3, may result in the location of the first point being superimposed on the video stream as an AR object, tagged to the object as it appears on both the mobile device and remote device displays. The object may appear as a dot, point, target, or another suitable graphic indicator, and may appear on either or both of the displays of the mobile device and/or remote device. As an AR object, the object of the first point will move throughout the frame of the video stream as if placed upon the tagged object or feature that is being measured.

Next, in operation 406, the user of the mobile device may move the mobile device along the object to position the mobile device to a second location for tagging of a second point. The second point may be on the same object as the first point, or may be located on any other arbitrary object or feature, e.g. measuring the dimensions of a room, the length of a counter, the distance between two objects, etc. As with the first point, a user of the remote device may instruct, via the two-way communications session, the user of the mobile device to move in a particular direction or to a specific location to capture the second point. The second location may place the first point out of view of the mobile device, particularly when a long object is imaged that cannot be fit within the field of view of the camera of the mobile device. In some embodiments, a line or other indicator may "grow" or extend from the first selected point as the mobile device is moved, indicating to users where the first point is located within the environment around the mobile device.

In some embodiments, even though the mobile device may be capable of capturing the entire measured object or locations of the first and second points in a single field of view, it nevertheless may be desirable to bring the mobile device relatively close to the locations of the first and second points individually. Depending on how the point cloud data is generated, decreasing the distance between the mobile device and a given point may allow for determining and/or measuring a more accurate and densely packed point cloud. The more accurate point cloud, in turn, facilitates a greater accuracy in any measurements computed between the points.

As the camera/mobile device is moved and if/when the first point leaves the field of view of the mobile device, additional AR feature points may be obtained as other parts of the environment come into view. Previously obtained feature points are retained in storage (either on the mobile device, remote device, central server, or a combination of any of the devices) while additional points are added to the point cloud for newly viewed parts of the environment. Simultaneous localization and mapping (SLAM), or another suitable technique, may be used to relate and integrate new points into the existing point cloud, so that the environment around the mobile device is progressively augmented with additional depth points as more of the environment passes through the view of the mobile device. In this way, the location of placed points (and/or other AR objects) within the mobile device's environment are remembered even when not in view of the mobile device, and reappear when their location comes back into view of the mobile device.

As will be understood, SLAM may include data such as the camera pose to determine the x, y and potentially, the z coordinates of the additional depth points that are added to the point cloud, with the camera pose and motion data being used to determine the coordinates of the additional points in relation to the previously established points. All points may be expressed with respect to a fixed anchor point within the environment, with the camera's position also being determined with respect to the anchor point. In other embodiments, the coordinates of the points in the point cloud may be expressed relative to the current position of the mobile device. In such an embodiment, the x, y, z coordinates of each point are continually changing and need to be continually or periodically recomputed as the camera pose changes.

Following movement of the mobile device to place the second location within view, in operation 408, a second point may be selected within the second location. In embodiments, the process for selecting the second point is comparable to operation 404. Any line that may have extended from the first point may terminate upon selection of the second point, thus indicating the measured path. Furthermore, in some embodiments, a user of either the mobile device or the remote device may be able to move either of the first or second points to alter the locations on the underlying object(s) that form the basis for the measurement.

In operation 410, once the first and second points are established, the distance between the two points is calculated with reference to the x, y, z coordinates determined for each of the first and second points. This can be computed using known trigonometric functions. The distance may be displayed to the mobile device, the remote device, or both. In some embodiments, the distance may be overlaid upon the line extending between the first and second points, similar to a tape measure. In other embodiments, the distance may be displayed statically on either of both of the mobile device and remote device. The mobile device, remote device, or central server may handle the distance calculations.

While method 400 describes two points used to compute a distance, it should be understood that operations 406 and 408 may be repeated to add additional points, e.g. third point, fourth point, fifth point, etc., with operation 410 calculating multiple distances, areas and/or volumes depending upon the number of points selected and the measurements desired by the user(s).

The various steps of method 400 rely upon the AR data to be time synchronized with the associated frames of the video stream. In FIG. 5, an example flow 1500 for synchronizing frames 1502 of a video stream captured by a capture device, such as mobile device 102, is depicted. Frames 1502, in various embodiments, are the individual sequential frames of the video stream that may be captured by a video camera, such as camera 104 on mobile device 102. Following a fingerprinting process that will be described below with respect to FIG. 6, a fingerprinted frame 1504 results that is synced with a portion of AR data that was captured substantially contemporaneously with the frame 1502. The end result is that each frame 1502 from the captured video becomes a fingerprinted frame 1504, thus providing a fingerprinted video that is synced with the AR data on a frame by frame basis. The collection of fingerprinted frames may be played back similar to the original video stream, but in synchronization with the AR data. AR data is described above with respect to FIGS. 2-4. The fingerprinted video is thus correlated with AR data, and results in AR feature points being available that are synchronized with each video frame, similar to how originally generated by an AR API executed on the capturing device, such as mobile device 102.

Figure 6:
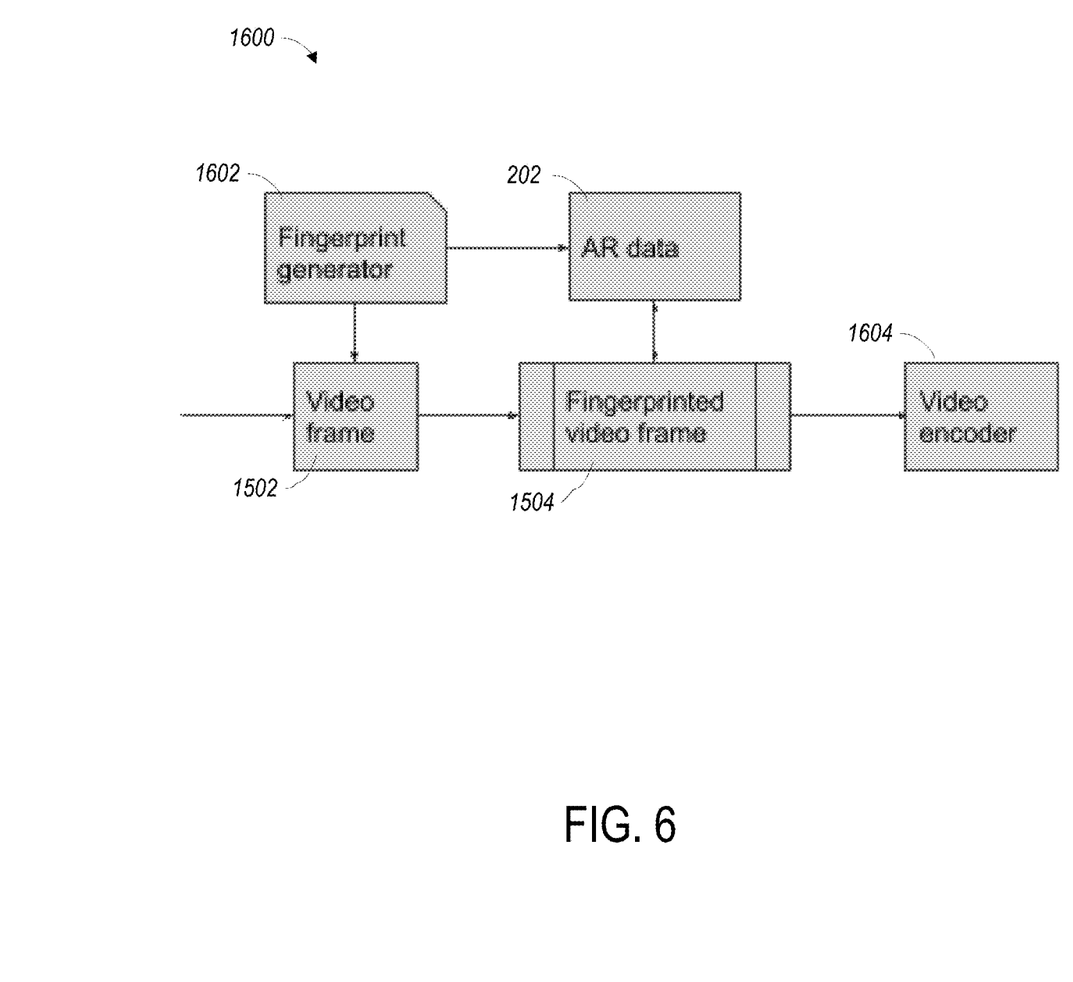
FIG. 6 depicts an example flow for fingerprinting the video frames that may be carried out in the high-level flow of FIG. 5, according to various embodiments.

Turning to FIG. 6, the fingerprinting process 1600 that results in each fingerprinted frame 1504 is depicted. A frame 1502 from the video stream, in embodiments, includes a timestamp or timecode, which can be used to synchronize the frame with data external to the frame, such as an audio track, or other data track. The AR data, such as AR data 202, can comprise one or more data tracks that can be synced to the video. Process 1600 may, in embodiments, include a fingerprint generator 1602, which creates a fingerprint data field that is unique for each frame and, by extension, for AR data associated with each frame. This fingerprint data field is then tagged to each frame 1502, resulting in fingerprinted video frame 1504, as well as the portion of AR data that corresponds to the frame 1502. The fingerprint in video frame 1504 may be visible or invisible to a viewer of the video frame, depending upon the method employed to tag the video frame. For example, the video frame fingerprint may be embedded within the image data of each frame in a location that is visible (e.g., traditional timecode), is out of frame (e.g. in image data that extends outside the visible area), is in metadata associated with each frame (such as a data structure for each frame that includes frame information separate from image data), or is embedded in another fashion so as to not be rendered visible, or via any other technique suitable for a given implementation. In still other implementations, embedding may be accomplished using a known digital watermarking technique, that allows a fingerprint or tag to be incorporated invisibly into a frame in a manner that is readily accessible by an appropriate algorithm. In some embodiments, such techniques may allow the fingerprint to be redundantly inserted into the frame, thus allowing the fingerprint to be retrieved even if some of the frame's image data or other associated data is corrupted. Thus, the AR data derived from a given frame can be recalled substantially contemporaneously when the frame is played back.

In embodiments, the fingerprinted video frames 1504 may be combined with the tagged AR data and supplied to a video encoder 1604. The video encoder 1604, in embodiments, takes each of the video frames 1504 and transcodes them into a selected video format, and further encodes the AR data into a data track that is integrated into the final video file produced by video encoder 1604. In other embodiments, the AR data may instead be placed into a separate file or database that is distinct from the video file, but can be recalled and synced during playback by use of the fingerprints. The use of a fingerprint, in addition to allowing synchronization of video frames with AR data, further offers a robustness that allows AR data to remain synchronized even if one or more frames of video are dropped or lost. Where a gap in frames is detected, the unique fingerprints can allow the AR data to readily be resynchronized with the frames. Further, depending upon the nature of the fingerprints, the fingerprint may allow detection of dropped frames, such as where the fingerprint changes incrementally or in a regular pattern between adjacent frames. Duplication of the fingerprint between a frame's image data and AR data may allow detection of dropped frames and/or data where the fingerprint data is missing from either the image data or AR data, but not both. Still further, deviation of the fingerprint from the expected pattern may allow for quick location of the correct AR data to retrieve by indicating how many frames were dropped or otherwise lost.

Finally, it should be recognized that point clouds from multiple captures, when correlated with the point cloud of an initial capture, may be merged into the initial capture point cloud, and that these subsequent captures may be from a variety of sources, e.g. crowdsourcing. For example, applying the techniques disclosed herein from crowd-sourced images for popular public locations can result in a dense and highly accurate point cloud for a potentially large and panoramic area. Such a point cloud in conjunction with multiple captured images may enable highly accurate placement of AR objects. Further, the point clouds from the subsequent capture(s) can be used, in conjunction with the initial capture point cloud, to regenerate an expanded and/or enhanced 3D mesh beyond the initial 3D mesh generated from the initial capture point cloud.

In some examples, objects appearing in a source capture may have been removed, moved, or altered, and/or new objects introduced, in the subsequent capture as compared to the original capture. In such scenarios, one or more different 3D meshes may be generated from the combined point clouds by selecting which capture should take priority for determining object presence. For example, a user could select to generate a 3D mesh with the initial capture having priority. In such a selection, objects appearing in the original capture that were removed or moved in subsequent captures would be rendered according to the original capture, but still utilizing data from subsequent captures that expand beyond the original capture and/or augmented objects that are unchanged between captures. In another example, a user could select to generate a 3D mesh with one of the subsequent captures having priority. The result would be a 3D mesh having objects appearing or located in the selected subsequent capture having priority over other earlier (or later) captures.

Figure 7:
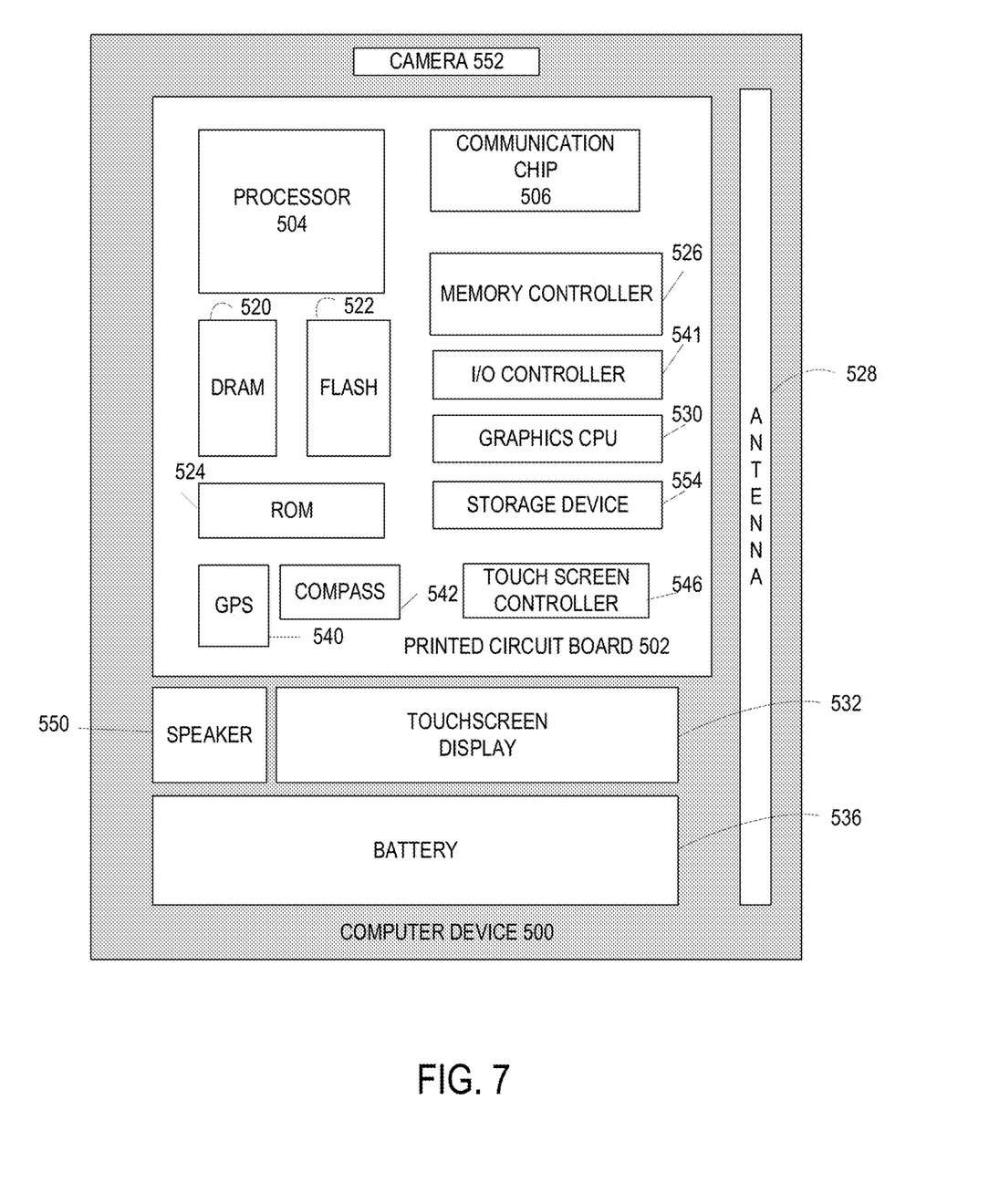
FIG. 7 is a block diagram of an example computer that can be used to implement some or all of the components of the system of FIG. 1, according to various embodiments.

FIG. 7 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100, system 200, method 400, process flow 1500, and/or process flow 1600, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 8:
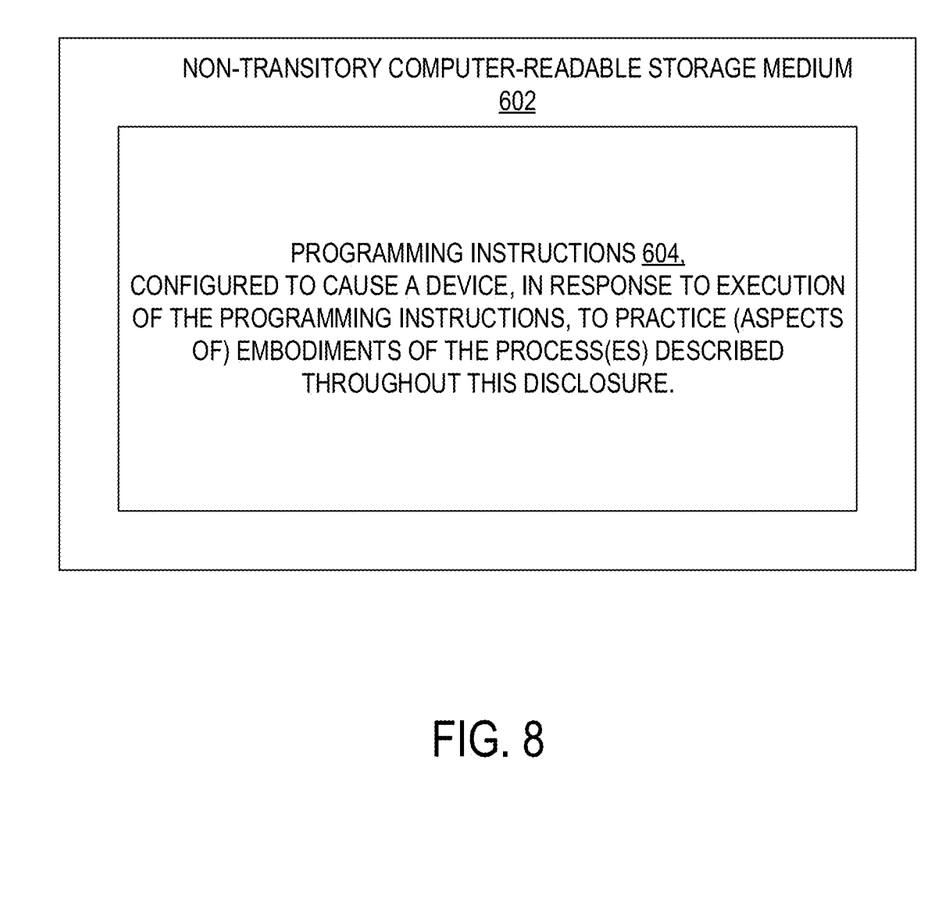
FIG. 8 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, system 200, method 400, process flow 1500, and/or process flow 1600. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for measuring a physical dimension from a remote video stream, comprising:
   establishing, with a device over a network, a two-way communications session that includes a video stream and augmented reality (AR) data correlated to the video stream;
   performing, prior to receiving any selections of points within the video stream, object detection on the video stream and AR data to determine object locations within the video stream;
   receiving a selection of a first point from a first view of the video stream;
   receiving a first densified point cloud for the first point;
   receiving a selection of a second point from a second view of the video stream;
   receiving a second densified point cloud for the second point;
   calculating, at the device, a coordinates of the first point within space based at least in part upon the AR data, detected objects, and the first densified point cloud;
   calculating, at the device, a coordinates of the second point within space based at least in part upon the AR data, detected objects, and the second densified point cloud; and
   calculating, at the device, a distance between the first point and the second point based upon the coordinates of the first point relative to the coordinates of the second point.

2. The method of claim 1, further comprising:
   receiving a selection of a third point from a third view of the video stream;
   calculating, at the device, a coordinates of the third point within space based at least in part upon the AR data; and
   calculating, at the device, an area defined by the first point, the second point, and the third point, based upon the coordinates of the first point, second point, and third point relative to each other.

3. The method of claim 2, further comprising:
   receiving a selection of a fourth point from a fourth view of the video stream;
   calculating, at the device, a coordinates of the fourth point within space based at least in part upon the AR data; and
   calculating, at the device, a volume defined by the first point, the second point, the third point, and the fourth point, based upon the coordinates of the first point, second point, third point, and fourth point relative to each other.

4. The method of claim 1, wherein the first view and second view overlap.

5. The method of claim 1, wherein the first view and second view do not overlap.

6. The method of claim 1, wherein the selection of the first point and the selection of the second point are received over the network.

7. The method of claim 1, wherein the selection of the first point and the selection of the second point are received from an interface that is part of the device.

8. A method for measuring one or more physical dimensions of an environment captured in a video stream, comprising:
   receiving, at a server, a video stream of an environment and augmented reality (AR) data correlated to the video stream from a first device;
   performing, prior to receiving any selections of points within the video stream, object detection on the video stream and AR data to determine object locations within the video stream;
   calculating, at the server, a point cloud from the video stream and the AR data;
   receiving, at the server, a selection of a first point within the video stream;

calculating, at the server, a first densified point cloud for the first point;
calculating, at the server, a location of the first point within the environment with respect to the detected objects and first densified point cloud;
receiving, at the server, a selection of a second point within the video stream;
calculating, at the server, a second densified point cloud for the second point;
calculating, at the server, a location of the second point within the environment with respect to the detected objects and second densified point cloud;
calculating, at the server, a distance between the first point and the second point based upon the location of the first point relative to the location of the second point; and
transmitting, by the server, the video stream, first point, second point, and distance to a second device.

9. The method of claim 8, wherein the selection of the first point and the selection of the second point are received from the first device.

10. The method of claim 8, wherein the selection of the first point and the selection of the second point are received from the second device.

11. The method of claim 8, further comprising:
generating, at the server, a first AR object at the location of the first point;
generating, at the server, a second AR object at the location of the second point; and
transmitting, to the first device and the second device, the first AR object and second AR object.

12. The method of claim 11, further comprising generating, at the server, an AR line connecting the first AR object to the second AR object; and transmitting, to the first device and the second device, the AR line.

13. A non-transitory computer readable medium (CRM) comprising instructions that, when executed by an apparatus, cause the apparatus to:
capture a video stream comprised of a plurality of frames, the video stream of an environment surrounding the apparatus;
capture augmented reality (AR) data corresponding to each frame of the plurality of frames;
capture camera pose data corresponding to each frame of the plurality of frames;
perform, prior to receiving any selections of points within the video stream, object recognition on the video stream;
receive, from an interface in communication with the apparatus, a selection of a first point within the video stream;
capture a first densified point cloud for the first point;
receive, from the interface in communication with the apparatus, a selection of a second point within the video stream;
capture a second densified point cloud for the second point;
calculate, with the AR data, camera pose data, recognized objects, and first and second densified point clouds, a location of the first point and a location of the second point within the environment; and
transmit the location of the first point, the location of the second point, the video stream, the AR data, and the camera pose data to a remote apparatus.

14. The CRM of claim 13, wherein the instructions are to further cause the apparatus to:
calculate, with the AR data, a distance between the location of the first point and the location of the second point; and
display, on the interface in communication with the apparatus, the distance.

15. The CRM of claim 13, wherein the interface is part of the apparatus.

16. The CRM of claim 13, wherein the interface is part of the remote apparatus, the remote apparatus in network communication with the apparatus.

17. The CRM of claim 13, wherein the first point is selected within the video stream when the interface presents a first view of the environment, and the second point is selected within the video stream when the interface presents a second view of the environment.

18. The CRM of claim 17, wherein the first view of the environment at least partially overlaps the second view of the environment.

19. The CRM of claim 17, wherein the first view of the environment does not overlap the second view of the environment.

20. The CRM of claim 19, wherein the instructions are to further cause the apparatus to track a motion of the interface as it is moved from the first view to the second view, and wherein the location of the second point is calculated with respect to the first point and the motion of the interface.

* * * * *